United States Patent [19]
Pavia, Jr.

[11] Patent Number: 5,215,805
[45] Date of Patent: Jun. 1, 1993

[54] FOAM PANEL ROOFING SYSTEM

[75] Inventor: Alfred Pavia, Jr., Delray Beach, Fla.

[73] Assignee: Royal "T" Holding, Inc., Delray Beach, Fla.

[21] Appl. No.: 728,556

[22] Filed: Jul. 11, 1991

[51] Int. Cl.$^5$ .............................................. B32B 3/26
[52] U.S. Cl. .................... 428/159; 428/247; 428/309.9; 428/313.5; 428/314.4; 428/319.1
[58] Field of Search ............. 428/309.9, 489, 159, 428/247, 304.4, 313.5, 314.4, 314.8, 319.1

[56] References Cited

U.S. PATENT DOCUMENTS

| | | | |
|---|---|---|---|
| 3,745,058 | 7/1973 | Paymal | 428/313.5 |
| 3,753,849 | 8/1973 | Duff | 428/446 |
| 4,136,223 | 1/1979 | Harder | 428/309.9 |
| 4,374,687 | 2/1983 | Yamamoto | 428/489 |
| 4,651,494 | 3/1987 | Van Wagoner | 428/489 |

FOREIGN PATENT DOCUMENTS

| | | | |
|---|---|---|---|
| 658023 | 2/1963 | Canada | 428/159 |
| 1058396 | 2/1967 | United Kingdom | 428/312.4 |

*Primary Examiner*—William J. Van Balen
*Attorney, Agent, or Firm*—Kenneth E. Merklen; John H. Faro

[57] ABSTRACT

Roofing systems are herein disclosed which lend themselves to simplified installation techniques and provide enhanced energy conservation over conventional roofing systems of comparable appearance. The system of this invention is based, in substantial part, upon the use of a large (typically 4'×8') panel of cellular structural foam as a replacement for ceramic and/or cast concrete roofing tiles ("Barrel" and "Bermuda" style tiles). In the preferred embodiments of this invention, a closed cell structural formed panel is molded or cut to simulate an array of roofing tiles. The simulated foam tile panel is further provided with a refractory (fireproofing) finish, such as stucco, or its equivalent. A finish coating is, thereafter, applied to the refractory coating to enhance water repellency and, thus, serve to further weatherproof the roofing panel. The finishing coating can be applied prior to or subsequent to installation of the foam tile panels. In one of the preferred embodiments of this invention the foam tile panel is laminated to a 4'×8' sheet of plywood or an "OSB" board; or, alternatively, internally structurally enforced. A reinforcing mesh is also preferably provided on the exposed surface of the panel and bonded thereto upon application of the refractory coating or finish. Structural inserts integral with the foam tile not only enhance its physical integrity and strength but also provide a means for attachment of the foam tile panel to the roof trusses.

14 Claims, 1 Drawing Sheet

FOAM PANEL ROOFING SYSTEM

BACKGROUND OF THE INVENTION

1. Field of the Invention

This invention is directed to an article of manufacture and to a method. More specifically, this invention relates to a foam tile roof panel and system; and, to a method for fabrication thereof.

2. Description of the Prior Art

The use of the synthetic (polymeric) materials as a replacement for more traditional construction materials has and continues to evolve, as the sources of the more traditional materials (wood) increase in costs and will become increasingly scarce.

Accordingly, plastic or synthetic based building products (once reserved primarily for decorative or cosmetic applications) are, and continue to find uses as structural materials as building codes become more relaxed, or in recognition of the functional equivalency or superiority of the engineering component prepared from the synthetic material.

Structural foam panels from closed cell expanded foam polystyrene and other common polymers have and continue to be used in lieu of plywood in the construction industry as underlayment for house siding and other construction applications where enhanced energy conservation is desired.

The following patents are represented of a use of foam materials (both polymer and concrete) in the fabrication of and in situ manufacture of construction materials: U.S. Pat. No. 3,962,841 (to Carol); U.S. Pat. No. 4,013,614 (to Self); U.S. Pat. No. 4,071,984 (to Larrow); U.S. Pat. No. 4,658,554 (to Riley); U.S. Pat. No. 4,774,794 (to Grieb); U.S. Pat. No. 4,712,349 (to Riley); and U.S. Pat. No. 4,799,982 (to Vicino).

U.S. Pat. No. 3,962,841 (to Carol) describes an insulating decking structure utilizing a sheet metal structural shape (envelope) containing a perforated foam synthetic board (16) having vertical holes to allow penetration of concrete through the foam board. In brief, the structure of the Carol system comprises a wire reinforced sub-purlin, or purlin, structure that includes a sheet metal envelope (12) or form, containing gypsum foam board (12), a perforated formed synthetic polymer board (13) and poured concrete (15) which penetrates through the polymer board (13) to the gypsum board (12). The exterior surface of the foregoing composite is finished with alternating layers of roofing felt and tar (16) and a waterproof wearing surface of tar and gravel (17).

U.S. Pat. No. 4,013,614 (to Self) describes a method for preparation of spray-up laminates by foaming-in-place an unsaturated polyester resin (hereinafter "synthetic resin"). The synthetic resin can be applied on both sides of expanded metal lathe (Example 3) and applied directly to corrugated metal building panels having a spray applied polyurethane base (example 4). The fabrication of laminated panels (in accordance with the teachings of Example 4) further contemplate a sequential application of these materials to the structure of metal panel (column 5, lines 36-58).

U.S. Pat. No. 4,071,984 (to Larrow) describes a structure, such as a house, assembled from pre-fabricated panels. The wall panels of the structure comprise a laminate, or composite, structure having an interior section of foamed material, such as polystyrene or urethane foam, with another surface comprising wood, aluminum or plastic. The apparent invention resides in the configuration of the panels to allow for their interlocking or integration with one another in the construction of a shelter.

U.S. Pat. No. 4,658,554 (to Riley) describes an insulated roofing system in which a waterproof plastic film or membrane is bonded to the under surface of a panel to positively exclude water. The panels to which this membrane is applied are preferably foam can be provided on a its upper surface with integral ribs, such as grooves, and of sufficient structural integrity to support concrete panels which can be placed upon and supported by the integral ribs. The integral ribs which are positioned between the foam panel and the concrete surface member provide (what is referred to in the Riley patent) "channels" for ventilation and moisture removal on hot, dry days. The concrete panels are not, according to Riley, are "simply abutted against one another, and preferably are laid so that the butted junctions do not coincide with the butted junctions of the underlying foam panels" (column 3, lines 31-34). Thus, it is apparent from Riley that the waterproof membrane on the interior of the composite is necessary to exclude water which penetrates between the concrete block and is not otherwise carried away by the ribs (16) which are intermediate between the concrete and the styrofoam panels. To the extent that any moisture does intrude beyond the interior ribs, the waterproof membrane (12), positioned between the ribs and the foam will presumably prevent any further intrusion thereof.

U.S. Pat. No. 4,774,794 (to Grieb) describes a foam cement building having walls, roof and/or floor formed from a plurality of self-supporting foam building blocks of varying densities. The exterior surface from the foam building blocks are coated with an architectural finish-such finish being formed from cement, reinforced with fiberglass mesh or fiberglass rovings or strands. The blocks are connected to one another by a "tongue and groove" arrangement which provides, once assembled, a monolithic structure.

U.S. Pat. No. 4,712,349 (to Riley) is essentially the same, (at least in relation to the instant invention), as U.S. Pat. No. 4,658,544 (discussed above).

U.S. Pat. No. 4,799,982 (to Vicino) describes a method and system for the manufacture of a modular, monolithic molded building structure from a dismantleable mold. The Vicino patent describes the sequential application of an expandable foam to various mold components along with reinforcing materials. The purpose and effect of the process described by Vicino is to provide a seamless building structure, (with the exception of windows and doors).

As is evident from the foregoing discussion, the techniques utilized in the past for the fabrication of foam based building products, including those prepared from synthetic polymers and concrete, has involved a variety of different expedients to accomplish the specific objective of their respective inventors. As is further apparent, none of the art discussed above provides a building product having both structural and finished features incorporated into a single panel, or panel array, suitable for use as a roofing material. In virtually all of the structures described above in the prior art, the use of an expandable foam has been simply to provide an insulating element without appreciation of its versatility; specifically the combination of its aesthetic and structural properties in a single element, while at the same time eliminating other unnecessary components which can reduce costs, construction complexities and weight, (which can be a material factor in engineering the trusses and other load bearing components).

OBJECTS OF THE INVENTION

It is the object of this invention to remedy the above as well as related deficiencies in the prior art.

More specifically, it is the principal object of this invention to provide a foam tile panel having enhanced energy conservation properties and ease of installation.

It is yet another object of this invention to provide a closed cell structural foam panel, conforming in outward appearance to either a "Bermuda" tile, or a "Barrel" tile.

It is still yet another object of this invention to provide a foam tile panel having a refractory-like outer surface and an internal structural reinforcement.

It is still yet another object of this invention to provide a foam tile panel having a refractory-like finish on the exposed surface thereof and the reinforcing member laminated to its innermost surface to provide both structural support and means for attachment to roof trusses and other structures members.

Additional objects of this invention include the in situ fabrication of foam tile panels and the finishing thereof in situ.

SUMMARY OF THE INVENTION

The above and related objects are achieved by providing a unique foam tile panel which can be prepared from relatively inexpensive expandable foam and used, in place of more traditional "Bermuda" tile and "Barrel" tile, in both new construction and re-roofing applications. The foam tile panel of this invention, in general, comprises a multilayered composite in which the major component thereof is a solid planar body comprising an exterior surface conforming in physical appearance to an array of roofing tiles. In the preferred embodiments of this invention the foam tile panel will conform in overall physical dimension to structural lumber and preferably be at least 4' by 8' in its major dimensions. The tile thickness can vary with the application thereof and the physical demands of the particular application. It is contemplated that the foam tile panel can be used independent of any underlayment, thus, saving both the roofing contractor and the consumer the additional time and expense for the addition of such structural material. In a re-roofing environment, the underlayment may already be present and this system is compatible for use in a re-roofing system as well.

In the preferred embodiments of this invention the planar body of the composite is associated with a perforated layer or mesh which conforms in overall dimensions to the exterior surface of the foam. The purpose of the perforated layer or mesh is to provide additional physical integrity to the relatively weak structural foam. The perforated layer or mesh is bonded to the exterior surface of the structural foam by application of a base coat, preferably comprising a refractory material. The base coat can be applied to the mesh and underlying foam at the factory and/or on-site, depending upon the nature of the installation and contractor preference. In the preferred embodiments of this invention, the base coat can also be pigmented. Subsequent to application of the base coat, a second finish is applied to the surface thereof to further enhance its weather resistance. This finish coating will preferably comprise an elastomeric material in order to lend additional physical and/or abrasion resistance to the exterior surface of the panel.

In another of the preferred embodiments of this invention, the foam will be internally reinforced with reinforcing members which are embedded in the foam along the interior surface thereof, and preferably run at right angles to the slope of the roof to which the foam tile panel is to be attached.

In another of the preferred embodiments of this invention the interior planar surface of the foam tile can be laminated to structural lumber or OSB board. In other embodiments of this invention, the foam will be internally reinforced.

Additional embodiments of this invention include a system in which the foam tile panel is assembled in situ and includes means for attachment thereof to the underlying roof trusses.

DETAILED DESCRIPTION OF THE DRAWING INCLUDING PREFERRED EMBODIMENTS

Figure 1:
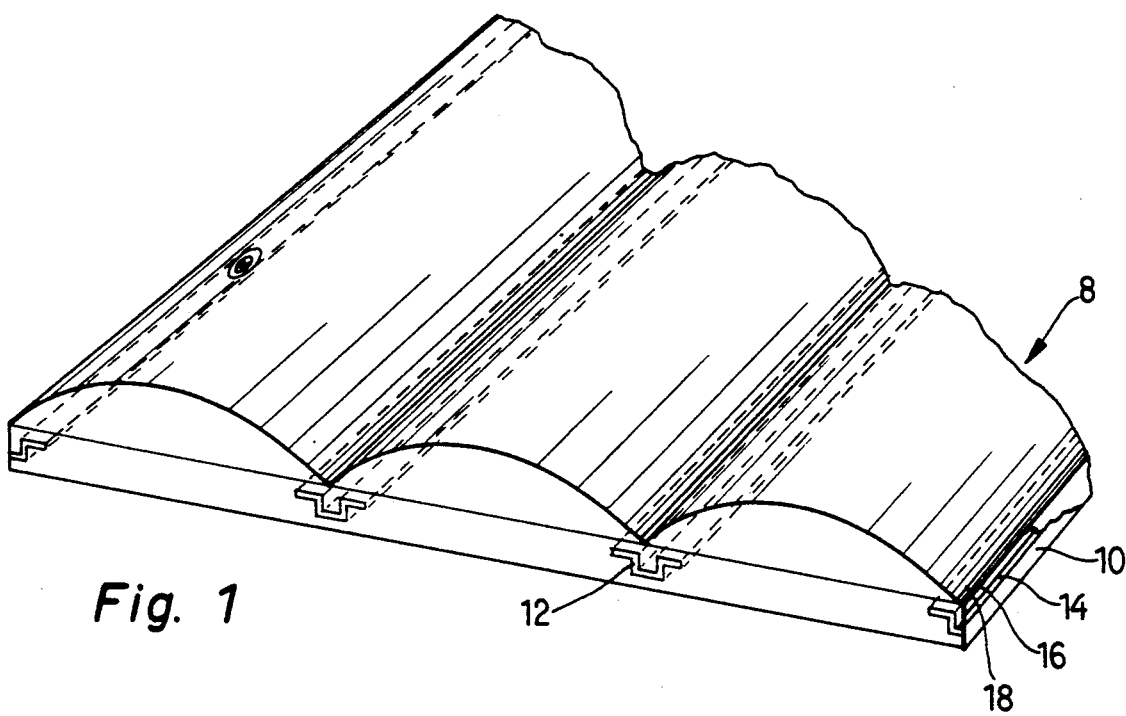
FIG. 1 is a perspective view, in partial cross-section, of a foam tile panel array of the instant invention.

The preferred embodiments of this invention are described in detail with reference to FIGS. 1-3. Where an element appears in more than one of the above Figures, it is assigned common reference numeral in the aid of understanding and continuity of discussion.

Figure 2:
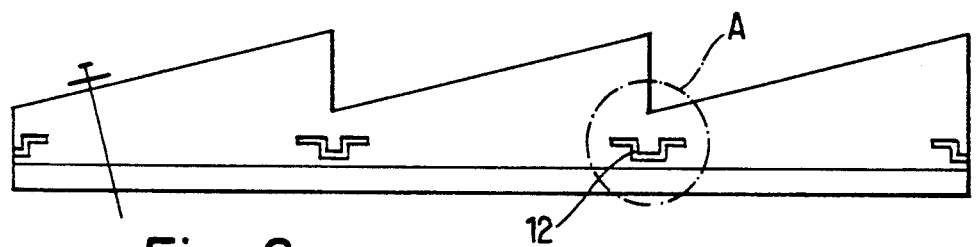
FIG. 2 is a side view of the foam tile panel array of the instant invention.

FIG. 1 depicts a preferred embodiment of the foam tile panels of this invention. The foam tile panel comprises a planar foam body (10) composed of a closed cell expandable foam, such as polystyrene or other suitable resin, which has been approved and in use by the building trade and building codes for construction purposes.

The foam tile panel is preferably shaped to conform to an array of individual Bermuda tiles (FIG. 2) or an array of individual barrel tiles (FIG. 1). The planar foam body is preferably reinforced with regularly spaced elements (12) to assist in the fastening of the panels to supporting roof joists or other substructure members.

The exposed surface of the foam tile panels (the surface which is to be exposed to the elements and to view) is also preferably internally reinforced.

In yet another preferred embodiment of this invention the exposed surface of the planar foam body is initially covered with a fiber mesh (14). The fiber mesh can be coextensive in dimension with a single foam tile panel or can span more than one panel. A stucco (16) finish is, thereupon, applied over the reinforcing fiber mesh so as to produce a coherent uniform and continuous coating and provide a bond between the mesh and the foam. Obviously where the stucco is applied at the time of installation, it will not only provide a continuous layer or coating panel between contiguous foam panels, but also fill any cavities or gaps which may exist between such panels at the time of installation. The stucco coating, as appreciated, is basically largely a refractory material and, thus, provides substantial fireproofing qualities to the exposed surface of the roof. In order to further enhance the weatherability of the exposed surface of the panel, an elastomeric coating is applied to the stucco finish. The elastomeric coating (18), can be pigmented or non-pigmented and will generally include weathering aids and further enhance the water repellency of the exposed surface of the finished foam tile panel.

The order application of the various coatings to the foam body will vary depending upon whether or not the foam tile panel is to be fabricated in situ or fabricated off-site, and simply installed as a finished product. In any event, it will be necessary in the latter case to effectively seal the joints between the adjacent panels in order to avoid any leakage or other intrusion which can impair the integrity of the roof and its underlying structure. This may simply involve the deferral of application of the elastomeric coating until the foam tile panel is installed, or simply the application of a second elastomeric coating where one has previously been applied at the factory.

In the preferred embodiments of the invention the abutting panels will interlock in some fashion either by virtue of a lap joint or a tongue-in-groove arrangement (not shown) in order to enhance their installation and otherwise insure a tight fit among contiguous panels.

In one of the preferred embodiments of this invention, the planar foam body of the panel is internally reinforced with structural members which not only provide and enhance strength to the finished panel, but also the means by which the panel can be effectively anchored to the underlying roof trusses. These reinforcing members can be in a variety of shapes and sizes, and the arrangement will vary depending upon the degree of reinforcement required and the applicable building code in the local in which they are to be used.

In the preferred embodiments of this invention, such reinforcing structures will run at generally right angles to the slope of the roof so as to enable nailing of the panels to the underlying trusses.

Figure 3:
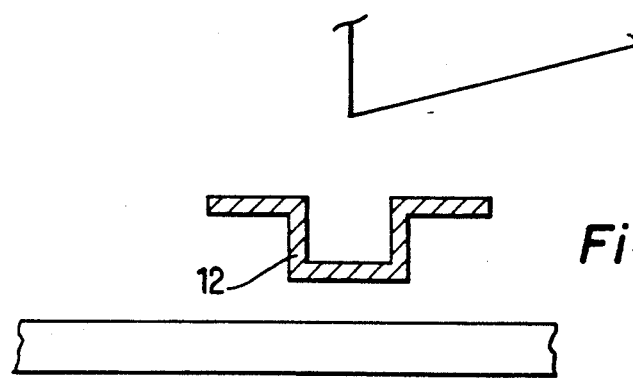
FIG. 3 is an expanded view of the imbedded fastener of the foam tile panel array of FIG. 2.

In another of the embodiments of this invention, as illustrated in FIG. 3, the panel is laminated to another layer of structural material, preferably lumber (i.e. plywood or OSB board).

What is claimed is:

1. A construction panel for a roofing system, said construction panel comprising:
   a) a solid planar body of a closed cell, expandable foam material, said solid planar body having a first surface and a second surface, said first surface of said solid planar body having a repetitive contour appearance;
   b) a reinforcing mesh substantially conforming in overall dimensions to said solid planar body and bonded to said first surface for reinforcing said construction panel, said reinforcing mesh having said repetitive contour appearance for defining an array of roofing tiles;
   c) a first coat of a refractory material applied to said array of roofing tiles for enhancing the fire resistance characteristics of said array of roofing tiles; and,
   d) a second coat of an elastomeric material applied to said first coat for increasing an abrasion resistance characteristic of said array of roofing tiles.

2. A construction panel as in claim 1 and in which said repetitive contour appearance is curvature and each tile, in said array of roofing tiles, is in a style of a barrel tile.

3. A construction panel as in claim 1 and in which said repetitive contour appearance is stepped and each tile, in said array of roofing tiles, is in a style of a Bermuda tile.

4. A construction panel as in claim 1 and in which said second surface of said solid planar body includes an anchoring means integrated into said second surface for coupling said construction panel to an underlying structure.

5. A construction panel as in claim 1 wherein said solid planar body is further provided with integral structural reinforcing members which are placed in cooperative relation to said second surface of said solid planar body for facilitating fastening of said construction panel to a structural member of a roof.

6. A construction panel as in claim 1, wherein an edge or butting surface between said first surface and said second surface of said solid planar body is further provided with means for matingly engaging an adjacent panel.

7. A construction panel for a roofing system, said construction panel comprising:
   a) a solid planar body of a closed cell, expandable foam material, said solid planar body having a first surface and a second surface, said first surface having a repetitive contour defining a plurality of roofing tiles;
   b) a reinforcing mesh means bonded to said first surface and substantially following said repetitive contour;
   c) a first coating of a refractory material bonded to said reinforcing mesh means for enhancing the fire resistance characteristics of said construction panel, said reinforcing mesh means for reinforcing said first coating; and,
   d) a second coating of an elastromeric material bonded to and covering said first coating for increasing an abrasion resistance characteristic of said construction panel.

8. A construction panel as in claim 7 and in which each contour of said repetitive contour is curvature and each tile of said plurality of roofing tiles is in a style of a barrel tile.

9. A construction panel as in claim 7 and in which each contour of said repetitive contour is angular and each tile of said plurality of roofing tiles is in a style of a Bermuda tile.

10. A construction panel as in claim 7 and further including anchor means integrated into said second surface for coupling said construction panel to an underlying structure.

11. A construction panel for a roofing system, said construction panel comprising:
   a) a planar body of a closed cell, expandable foam material, said planar body having a first surface and a second surface, said first surface defining a plurality of roofing tiles arranged in a predetermined pattern;
   b) a reinforcing mesh bonded to said first surface and substantially contouring said predetermined pattern;
   c) a first coating of a refractory material bonded to said reinforcing mesh and conforming to said predetermined pattern, said refractory material for increasing fire resistance characteristics of said planar body; and,
   d) a second coating of an elastomeric material bonded to said first coating and conforming to said predetermined pattern, said elastromeric material for increasing abrasion resistance characteristics of said construction panel, said reinforcing mesh for reinforcing said refractory material and said elastomeric material.

12. A construction panel as in claim 11 and in which each tile of said plurality of roofing tiles is in a style of a Bermuda tile.

13. A construction panel as in claim 11 and in which each tile of said plurality of roofing tiles is in a style of a barrel tile.

14. A construction panel as in claim 11 and further including anchor means coupled to said second surface for connecting said construction panel to an underlying structure.

* * * * *